US012400509B2

(12) United States Patent
Chang

(10) Patent No.: US 12,400,509 B2
(45) Date of Patent: Aug. 26, 2025

(54) BILL RECEIVING BOX

(71) Applicant: Top Vending Machine Electronics Co., Ltd., Taoyuan (TW)

(72) Inventor: Yuan-Fong Chang, Taoyuan (TW)

(73) Assignee: Top Vending Machine Electronics Co., Ltd., Taoyuan (TW)

(*) Notice: Subject to any disclaimer, the term of this patent is extended or adjusted under 35 U.S.C. 154(b) by 212 days.

(21) Appl. No.: 18/317,124

(22) Filed: May 15, 2023

(65) Prior Publication Data

US 2024/0386768 A1 Nov. 21, 2024

(51) Int. Cl.

| | |
|---|---|
| ***G07D 11/12*** | (2019.01) |
| ***B65H 1/12*** | (2006.01) |
| ***B65H 31/14*** | (2006.01) |
| ***G07D 11/00*** | (2019.01) |
| ***G07D 11/13*** | (2019.01) |
| ***G07D 11/14*** | (2019.01) |

(52) U.S. Cl.

CPC ............. *G07D 11/009* (2013.01); *B65H 1/12* (2013.01); *B65H 31/14* (2013.01); *G07D 11/12* (2019.01); *G07D 11/14* (2019.01); *G07D 2211/00* (2013.01)

(58) Field of Classification Search

CPC .......... B65H 1/12; B65H 31/14; B65H 1/266; B65H 1/04; B65H 2701/1912; G07D 11/12; G07D 11/13; G07D 11/009

See application file for complete search history.

(56) References Cited

U.S. PATENT DOCUMENTS 5,209,395 A * 5/1993 Zouzoulas ........... G07D 11/125 109/66
6,375,185 B1 * 4/2002 Lin ........................ B65H 29/22 271/180
2010/0102502 A1 * 4/2010 Saltsov ................ G07D 11/125 271/145
2010/0320056 A1 * 12/2010 Yu .......................... G07D 11/14 194/207

FOREIGN PATENT DOCUMENTS

EP 2053566 A1 * 4/2009 ............. B65H 1/266
JP 2007031024 A * 2/2007

* cited by examiner

*Primary Examiner* — Luis A Gonzalez
(74) *Attorney, Agent, or Firm* — Best & Flanagan LLP

(57) ABSTRACT

A bill receiving box includes a box body having a bill pressing opening intercommunicating with a receiving space of the box body for receiving bills. Front and rear pressing boards are slidably received in the receiving space and spaced from each other. Front and rear springs are disposed in the receiving space of the box body. Two ends of the front spring respectively abut against the front pressing board and the rear pressing board. Two ends of the rear spring respectively abut against the rear pressing board and a rear end of the box body. The rear spring biases the rear pressing board and the front spring forward, and the front spring biases the front pressing board forward, such that the front pressing board presses the bills forward to abut against a rear side of the bill pressing opening. The receiving space receives at least 700 sheets of stacked bills.

4 Claims, 17 Drawing Sheets

BILL RECEIVING BOX

BACKGROUND OF THE INVENTION

The present invention relates to the field of a bill receiving apparatus and, more particularly, to a bill receiving box for a bill receiving apparatus.

Automatic vending machines of commodities, such as automatic ticket vending machines, automatic payment terminals or bill changers, are generally provided in many public places for convenience and rapidity. These machines generally include a bill receiving apparatus for receiving the bills from the users for trading purposes.

A typical bill receiving apparatus generally includes a bill receiving device and a cash box disposed behind the bill receiving device. A passage is disposed behind a bill inlet of the bill receiving device, and a delivery device and a currency detector are disposed on the passage. A bill pushing device is disposed behind the passage and is aligned with a bill receiving space of the cash box. The cash box includes a pressing board disposed in an opening of the bill receiving space and a spring for returning the pressing board. When a bill enters the passage via the bill inlet, the delivery device of the bill receiving device is activated to move the bill rearward, and the currency detector detects the bill to check whether the bill is genuine. When it is determined that the bill is genuine, a bill pushing board of the bill pushing device pushes the bill and returns, thereby pushing the bill and the pressing board into the bill receiving space of the cash box. At the same time, the pressing board is biased by the elastic returning force of the spring to press against the bill for positioning and storage.

However, the current cash box utilizing the combination of the pressing board and the spring can only be used to receive 100, 300, or 500 sheets of bills, such that a worker has to frequently retrieve the cash box. In a case that more than 700 sheets or even 1,000 sheets of bills are to be received in the cash box, aside from increasing the bill receiving space and the sliding travel of the pressing board, the operation travel and the elastic force of the spring must also be increased. However, the operation stability of receiving and pressing the bills is apt to be adversely affected, even causing bill jam. Thus, a need exists for a novel design which mitigates and/or obviate the above drawbacks.

BRIEF SUMMARY OF THE INVENTION

An objective of the present invention is to provide a bill receiving box including front and rear pressing boards disposed in a receiving space, and front and rear springs are disposed in the bill receiving space to sequentially and stably receive and press bills. Furthermore, the receiving space may receive at least 700 sheets or even more than 1,000 sheets of stacked bills. Thus, the frequency and time required by the worker to retrieve the bill receiving box can be reduced.

To achieve the above objective, a bill receiving box according to the present invention is configured for receiving a plurality of bills pushed thereinto by a bill receiving device. The bill receiving box comprises a box body, a bottom cover, a front pressing board, a rear pressing board, a front spring, and a rear spring. The box body includes a receiving space configured for receiving the plurality of bills stacked in a front-rear direction. The box body includes a front end having a bill pressing opening intercommunicating with the receiving space. The box body includes a bottom portion having a bill retrieving opening intercommunicating with the receiving space. The bottom cover is pivotably connected to the bottom portion of the box body and is configured for controlling opening and closing of the bill retrieving opening. The front and rear pressing boards are disposed upright in the receiving space in a vertical direction perpendicular to the front-rear direction and are slidable in the front-rear direction. The front pressing board faces the bill pressing opening. The rear pressing board is disposed behind and spaced from the front pressing board. The front spring is disposed in the receiving space of the box body and includes two ends respectively abutting against the front pressing board and the rear pressing board. The rear spring is disposed in the receiving space of the box body and spaced from the front spring in the front-rear direction. The rear spring includes two ends respectively abutting against the rear pressing board and a rear end of the box body. The rear spring biases the rear pressing board and the front spring forward. The front spring biases the front pressing board forward, such that the front pressing board presses the plurality of bills forward to abut against a rear side of the bill pressing opening. The receiving space is configured to receive at least 700 sheets of stacked bills.

In an example, the receiving space of the box body is configured to receive at least 1,000 sheets of stacked bills.

In an example, the box body includes a length in the front-rear direction greater than a height of the box body in the vertical direction.

In an example, the box body includes a pivotal axle disposed on a front end of the bottom portion of the box body. The bottom cover includes a front end having a pivotal portion in pivotal connection with the pivotal axle. The pivotal portion includes an abutting portion protruding outward from an outer periphery of the pivotal portion. When the bottom cover pivots downward about the pivotal axle through at least 90 degrees to an open position, the abutting portion pivots upward to a location positioned by the front end of the bottom portion of the box body.

In an example, the bottom portion of the box body includes a rear end having a coupling hole intercommunicating with the receiving space. The bottom cover includes a rear end having a coupling arm capable of moving into and out of the receiving space. The coupling arm includes a distal end having a coupling portion configured to be inserted rearward to couple with the coupling hole. The coupling arm includes a pressing portion which is pressable to move the coupling portion forward to thereby disengage from the coupling hole. The bottom cover includes a limiting member adjacent to the pressing portion for limiting forward pressing travel of the coupling arm.

The present invention will become clearer in light of the following detailed description of illustrative embodiments of this invention described in connection with the drawings.

DETAILED DESCRIPTION OF THE INVENTION

Figure 15:
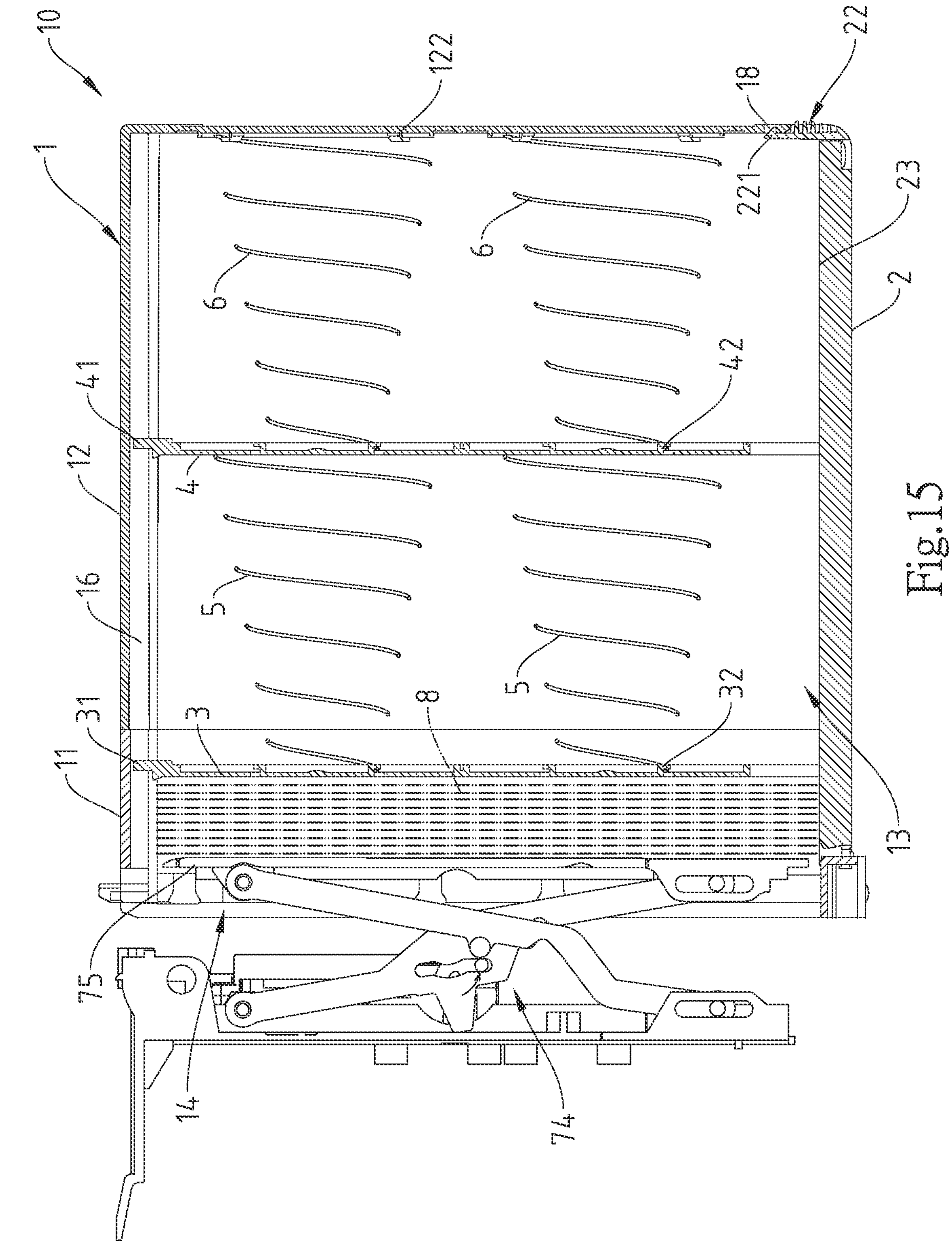
FIG. 15 is a schematic cross sectional view illustrating bill reception operation of the bill receiving box according to the present invention.

With reference to FIGS. 1-7, a bill receiving box 10 according to the present invention is disposed behind a bill receiving device 7 and is configured to receive bills 8 (see FIG. 15) pushed into the bill receiving box 10 by the bill receiving device 7. The bill receiving device 7 includes a machine body 71 on which a bill inlet 72, a bill detection mechanism 73, a bill pushing mechanism 74, and a bill pushing board 75 are disposed. The bill receiving box 1 comprises a box body 1, a bottom cover 2, a front pressing board 3, a rear pressing board 4, a front spring 5, and a rear spring 6.

The box body 1 is comprised of a front casing 11 and a rear casing 12 coupled with the front casing 11. The rear casing 12 includes a plurality of engaging hooks 121 coupled with a plurality of coupling holes 111 of the front casing 11 (see FIG. 7), and a connecting member 19 is provided for fixing purpose. The box body 1 includes a receiving space 13 therein for receiving a plurality of bills 8 stacked in a front-rear direction (see FIG. 15). The box body 1 includes a front end having a bill pressing opening 14 intercommunicating with the receiving space 13. The box body 1 includes a length in the front-rear direction greater than a height of the box body 1 in a vertical direction perpendicular to the front-rear direction. The box body 1 includes a bottom portion having a bill retrieving opening 15 intercommunicating with the receiving space 13. The receiving space 13 includes a top portion having a guiding groove 16 extending in the front-rear direction. The box body 1 includes a pivotal axle 17 disposed on a front end of the bottom portion of the box body 1. A plurality of hooked portions 122 is disposed on each of upper and lower sections of an inner wall of the rear end of the box body 1. The bottom portion of the box body 1 includes a rear end having a coupling hole 18 intercommunicating with the receiving space 13.

The bottom cover 2 includes a front end having a pivotal portion 21 in pivotal connection with the pivotal axle 17. As shown in FIGS. 6, 7, 9, 10, and 13, the pivotal portion 21 includes an abutting portion 211 protruding outward from an outer periphery of the pivotal portion 21. The bottom cover 2 is pivotably connected to the bottom portion of the box body 1 and is configured to control opening and closing of the bill retrieving opening 15. The rear end of the bottom cover 2 has a coupling arm 22 capable of moving into and out of the receiving space 13. The coupling arm 22 includes a top end having a coupling portion 221 configured to be inserted rearward to couple with the coupling hole 18. The coupling arm 22 includes a pressing portion 222 at a mediate portion thereof. The pressing portion 222 can be pressed to move the coupling portion 221 forward to thereby disengage from the coupling hole 18. The bottom cover 2 includes a reinforcing member 23 adjacent to the pressing portion 222.

The front pressing board 3 and the rear pressing board 4 are disposed upright in the receiving space 13 in a vertical direction perpendicular to the front-rear direction and are slidable in the front-rear direction. As shown in FIGS. 3, 4, 7, and 8, guiding blocks 31, 41 disposed on top ends of the front and rear pressing boards 3, 4 are slidably received in the guiding groove 16. The front pressing board 3 faces the bill pressing opening 14. The rear pressing board 4 is disposed behind and spaced from the front pressing board 3. Plural hooked portions 32, 42 are disposed on upper and rear sections of rear sides of the front and rear pressing boards 3 and 4.

Figure 1:
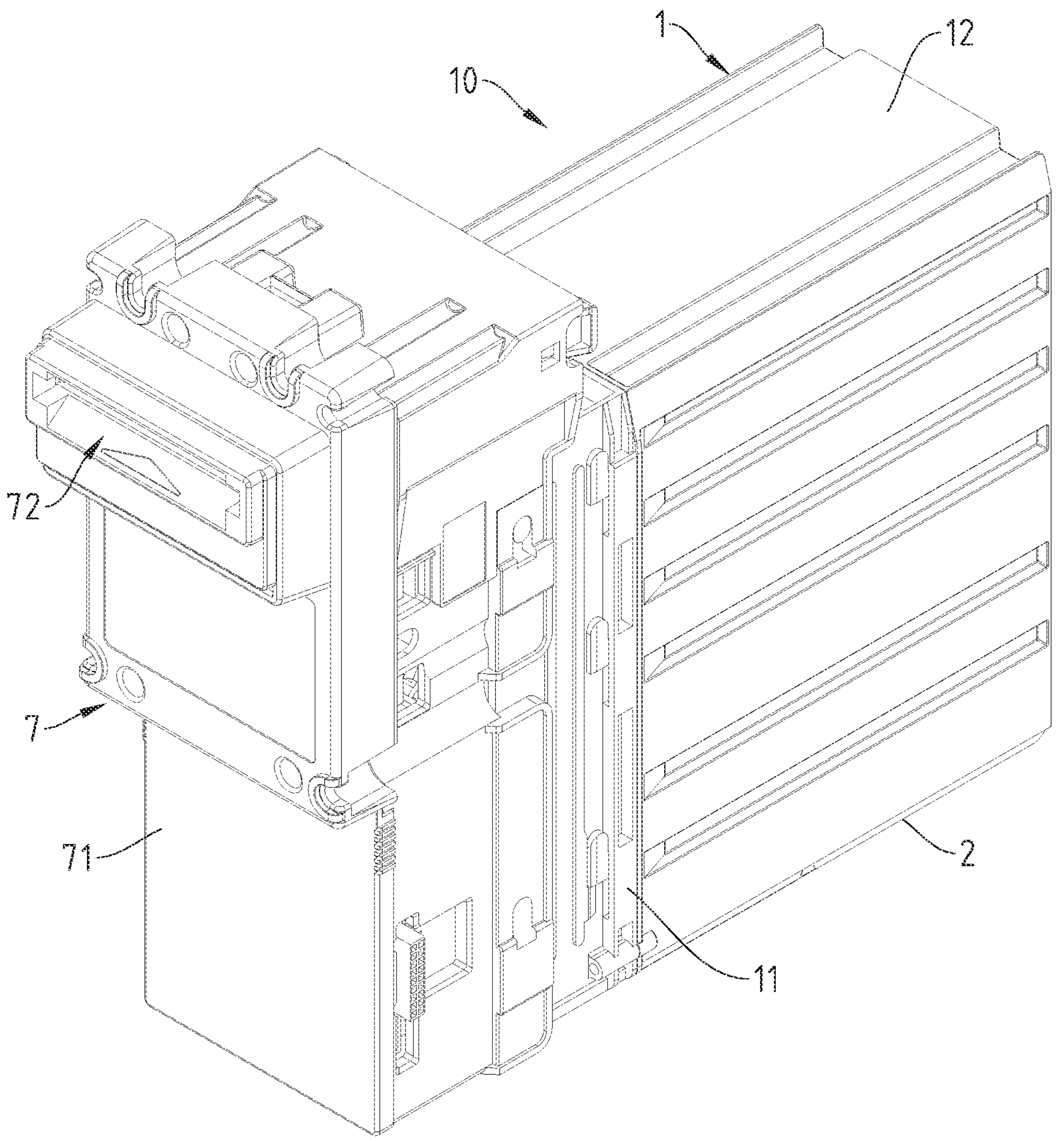
FIG. 1 is a front, perspective view of a bill receiving box according to the present invention coupled with a bill receiving device.
Figure 2:
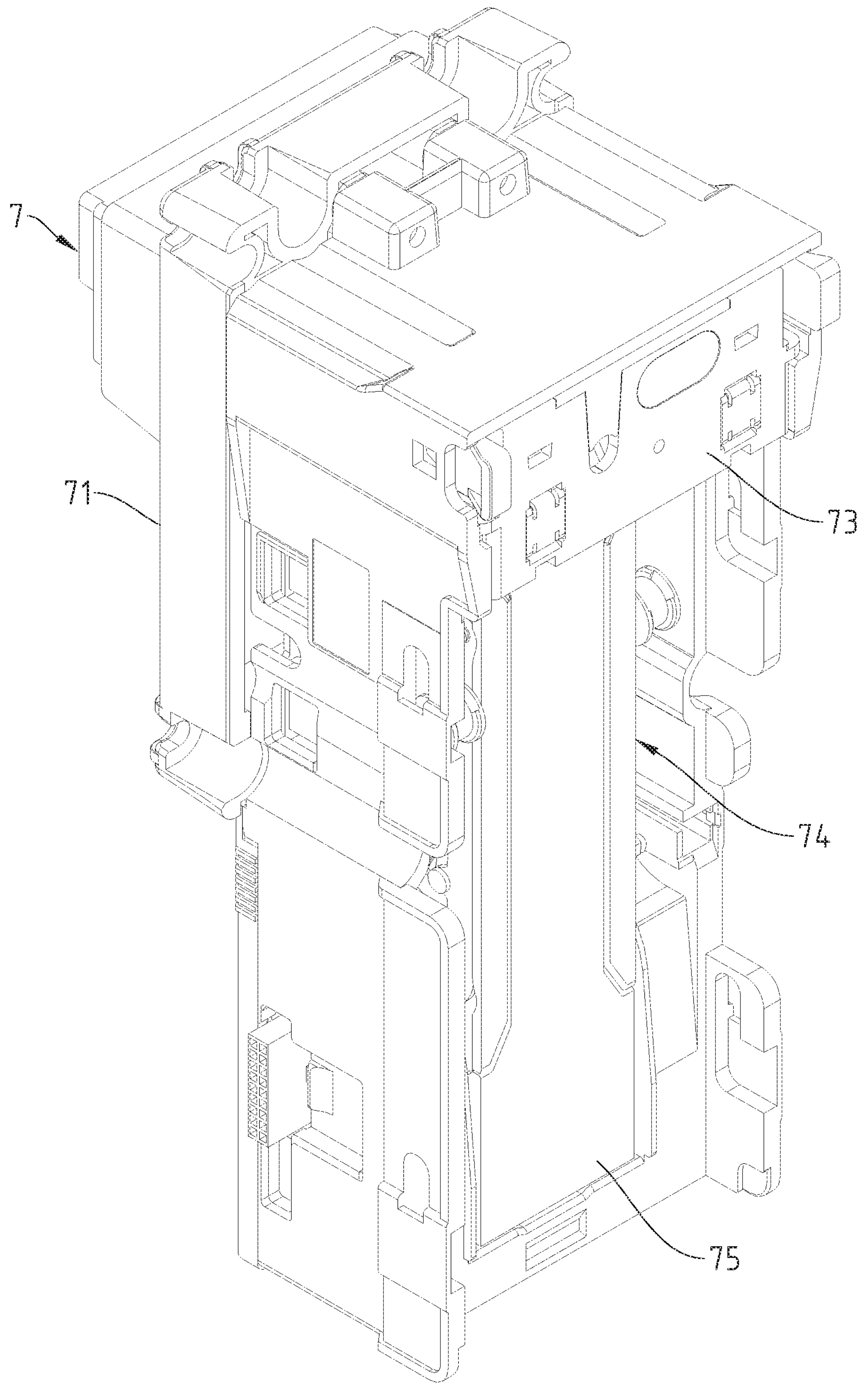
FIG. 2 is a rear, perspective view of the bill receiving device of FIG. 1.
Figure 3:
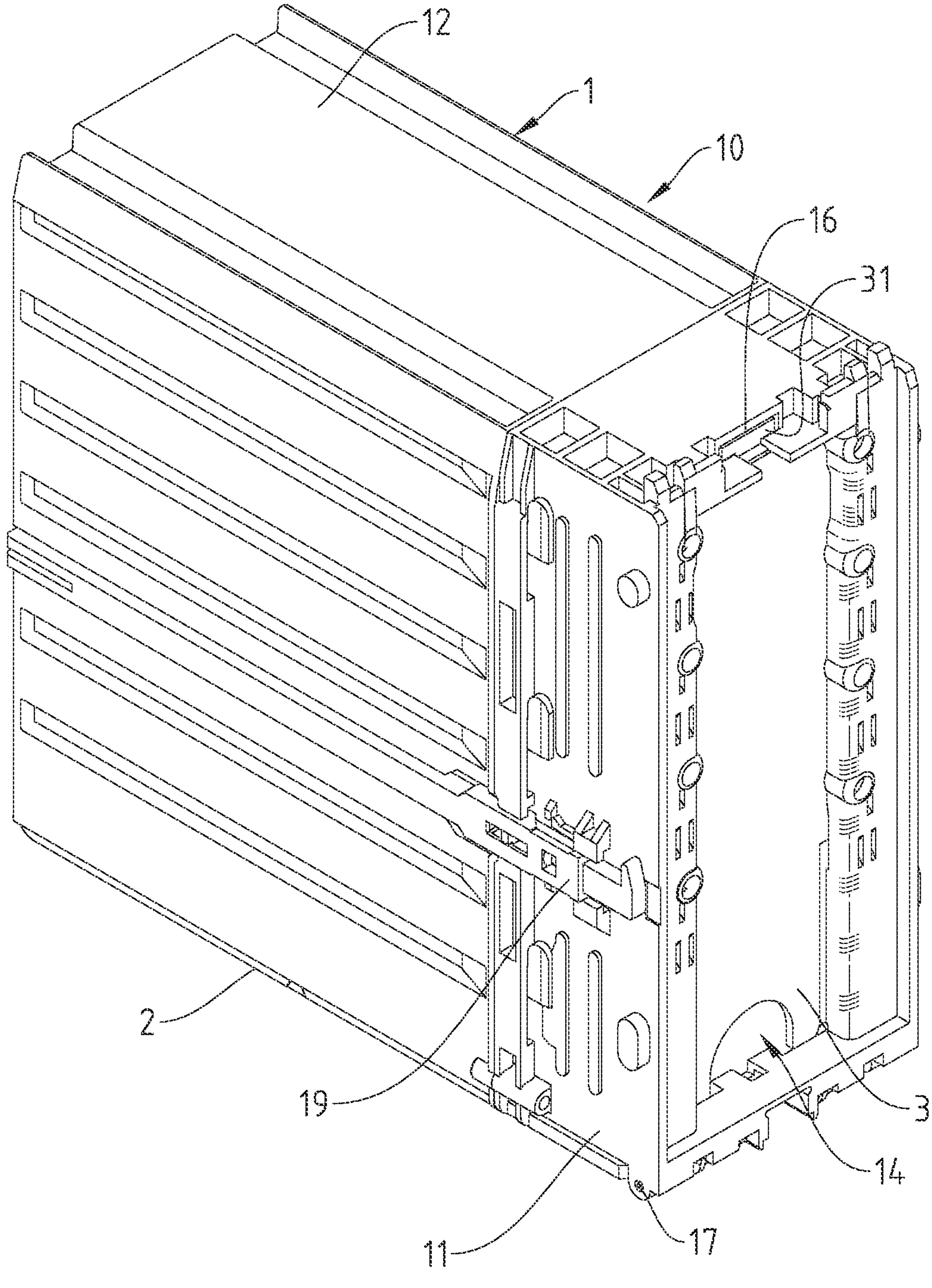
FIG. 3 is a front, perspective view of the bill receiving box according to the present invention.
Figure 4:
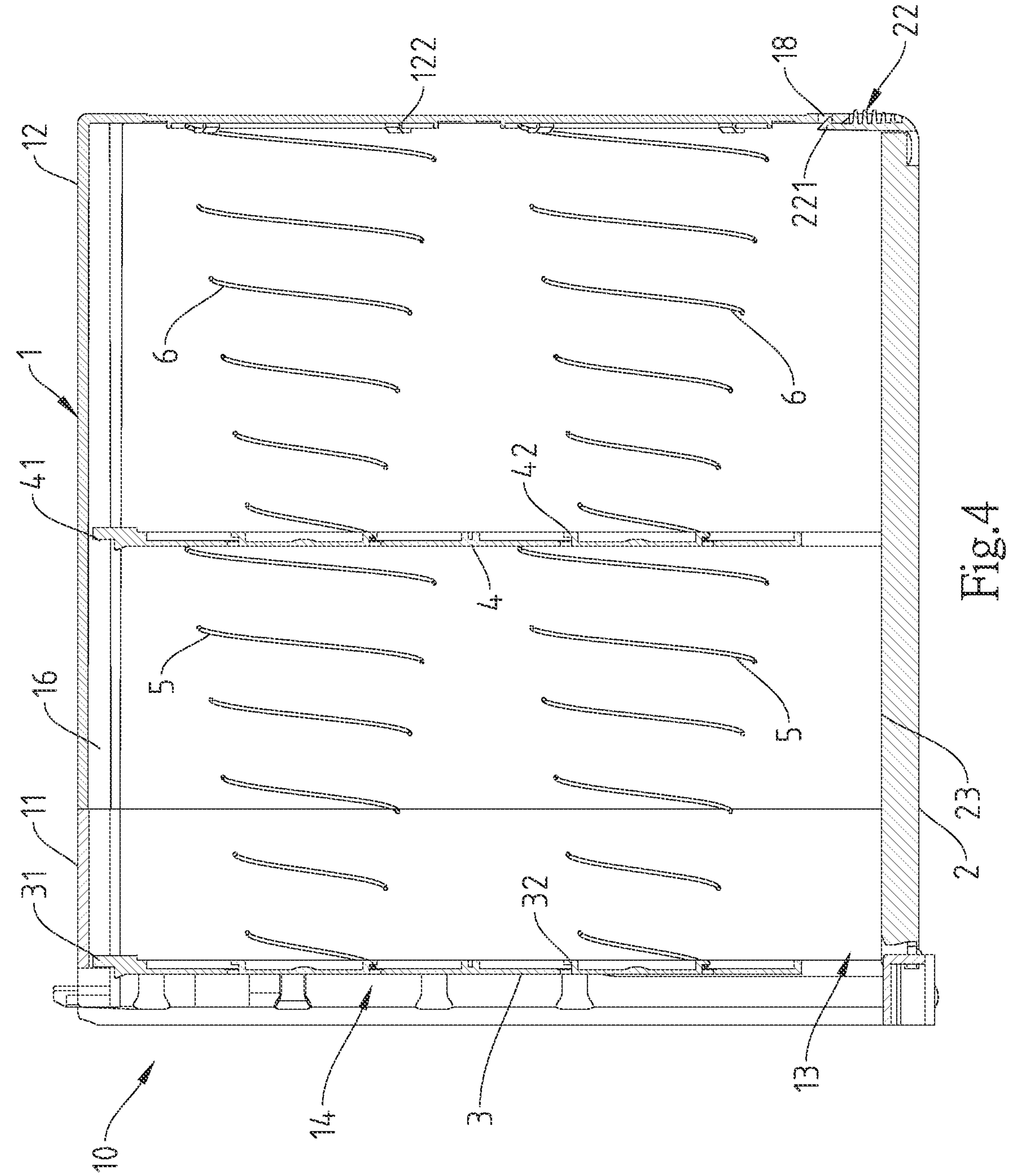
FIG. 4 is a cross sectional view of the bill receiving box according to the present invention.
Figure 5:
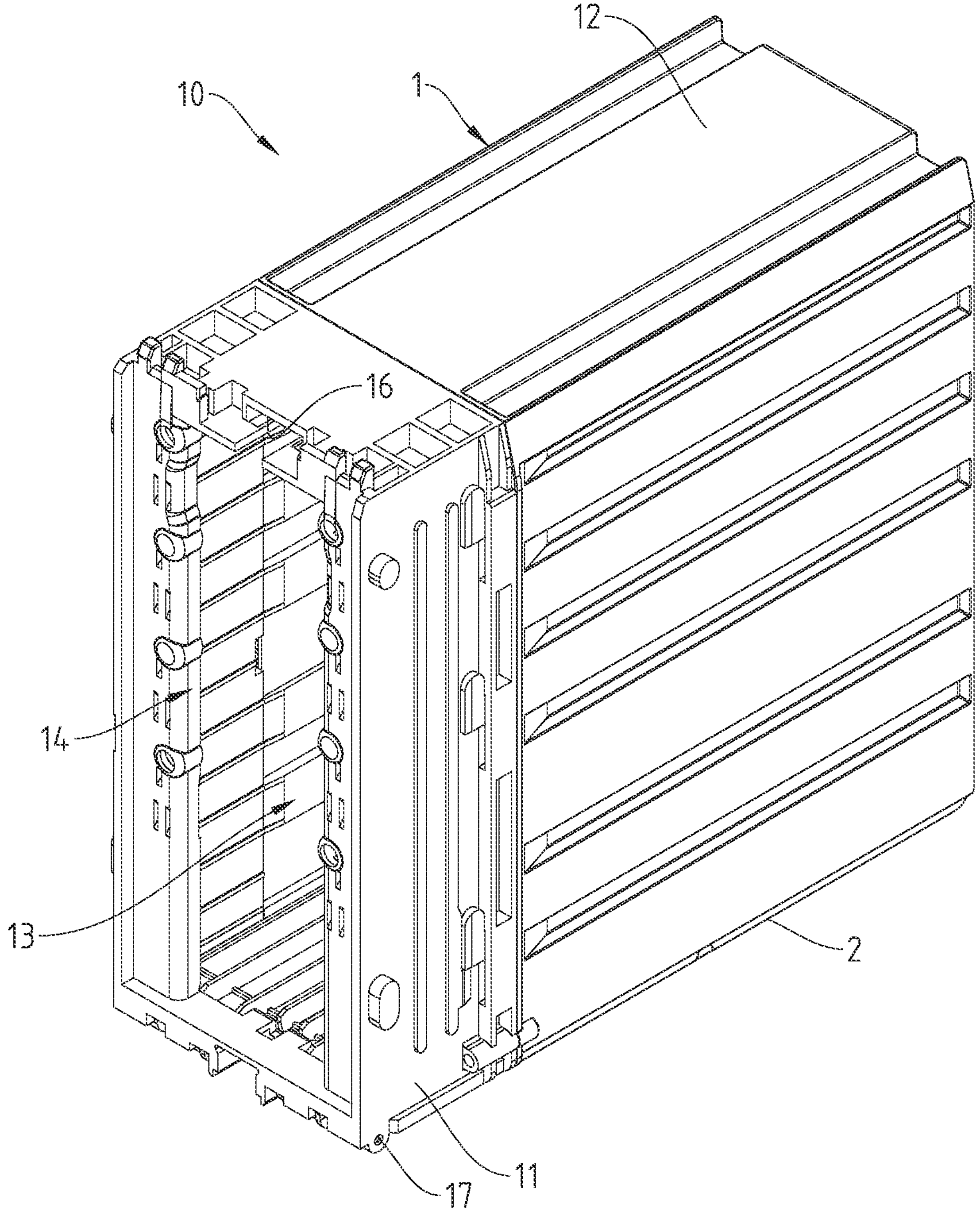
FIG. 5 is a front, perspective view of the bill receiving box according to the present invention with a front pressing board moved rearward and hidden in a rear section of a box body.
Figure 6:
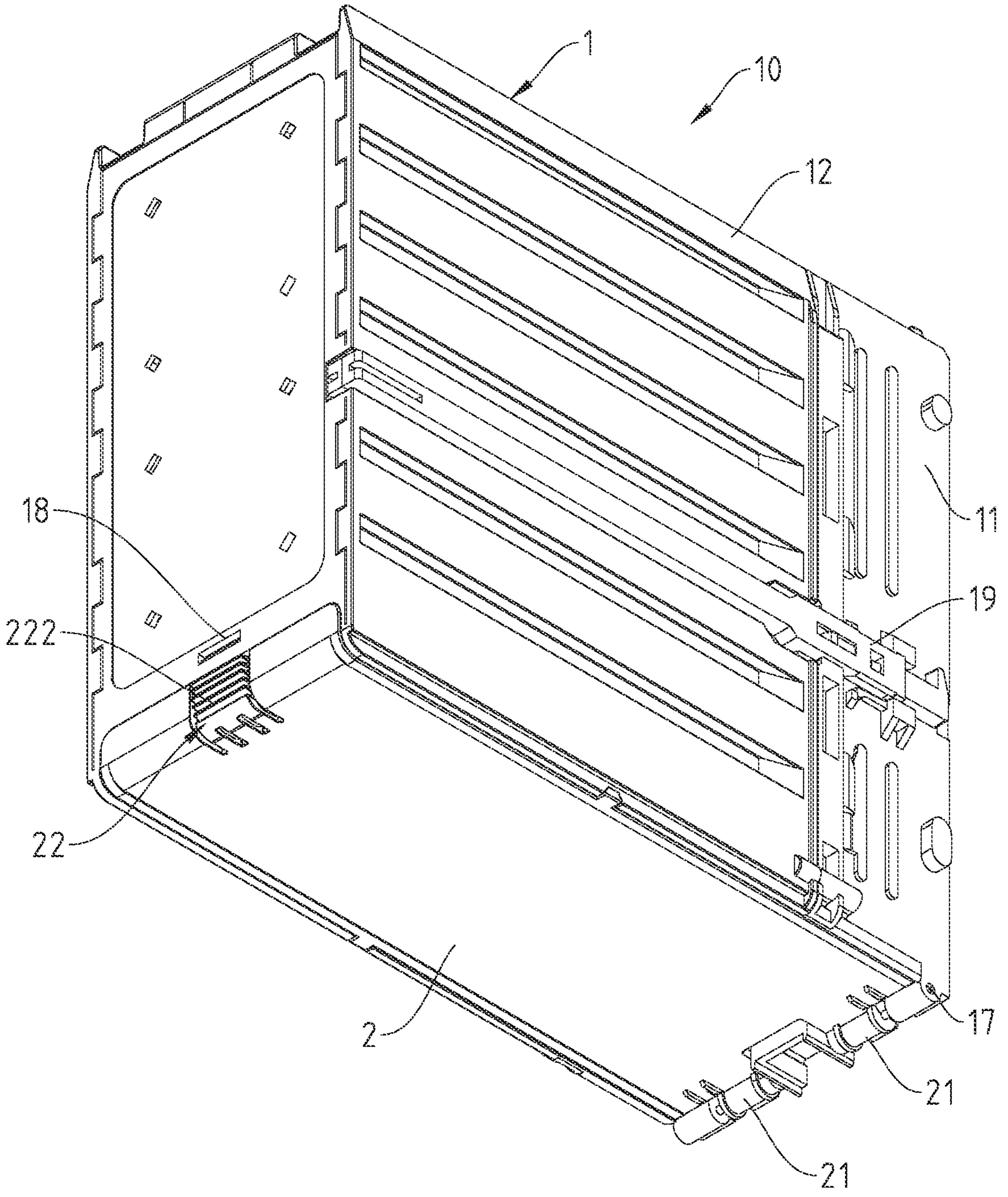
FIG. 6 is a perspective view illustrating a rear side and a bottom side of the bill receiving box according to the present invention.
Figure 7:
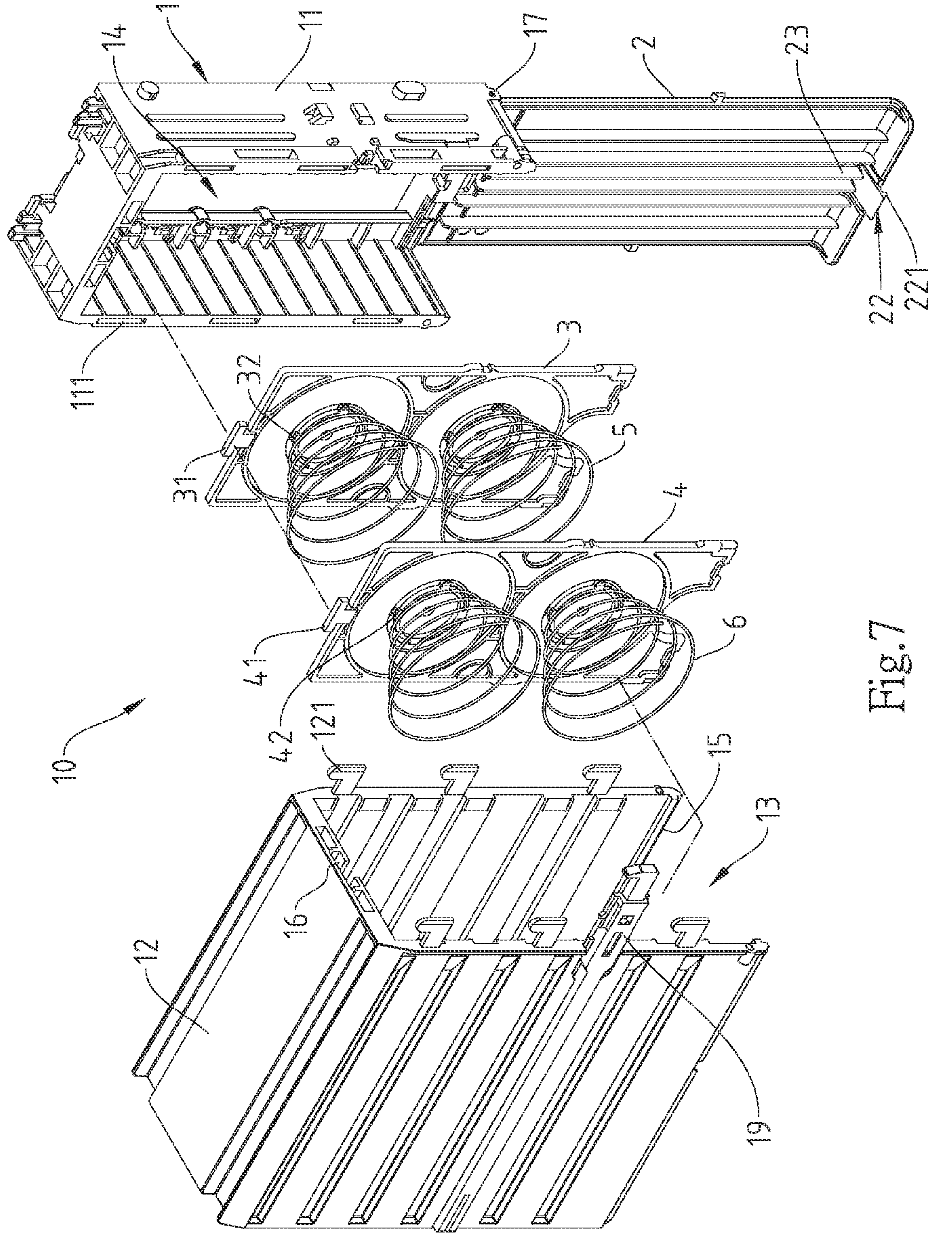
FIG. 7 is an exploded, perspective view of the bill receiving box according to the present invention.
Figure 8:
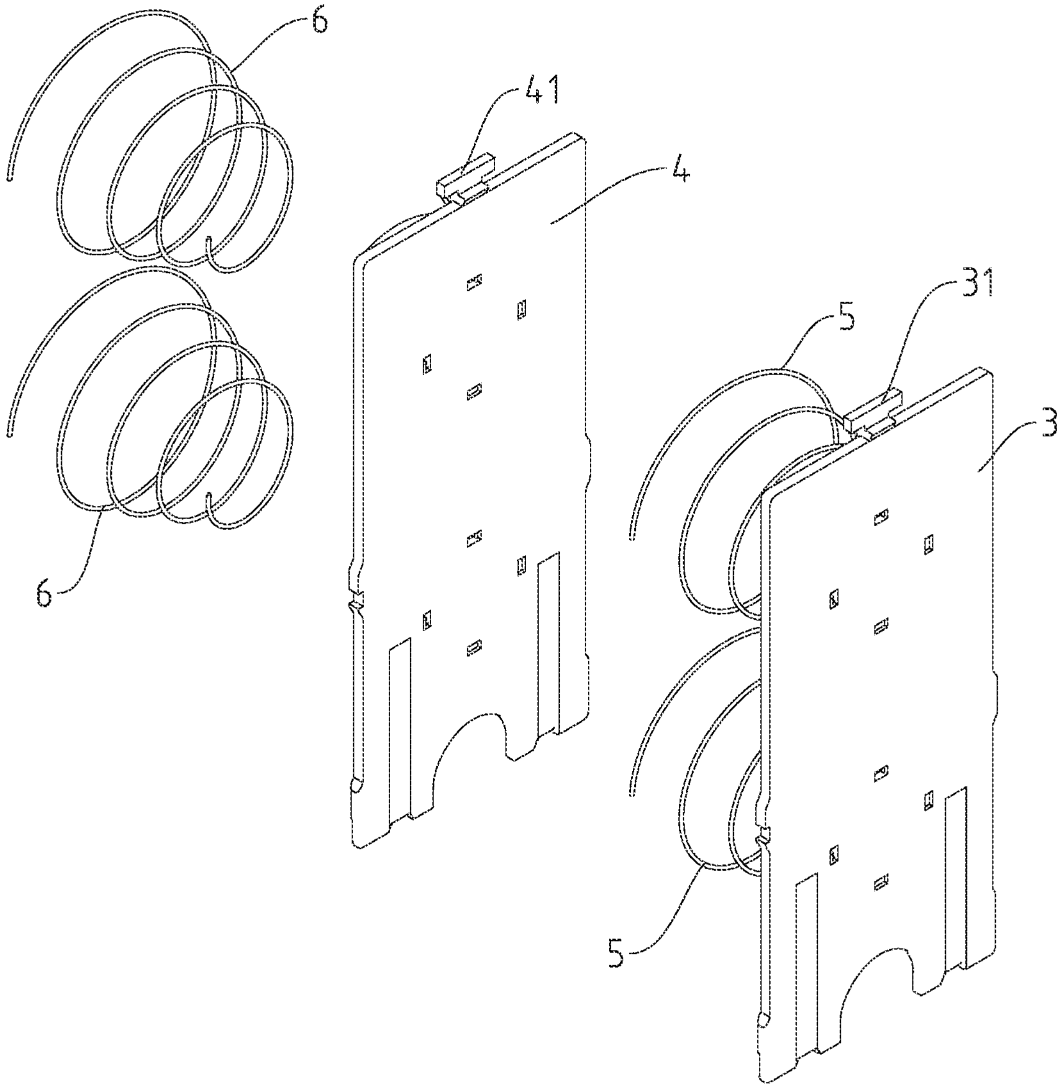
FIG. 8 is an exploded, perspective view of a front pressing board, a rear pressing board, a front spring, and a rear spring of the bill receiving box according to the present invention.
Figure 9:
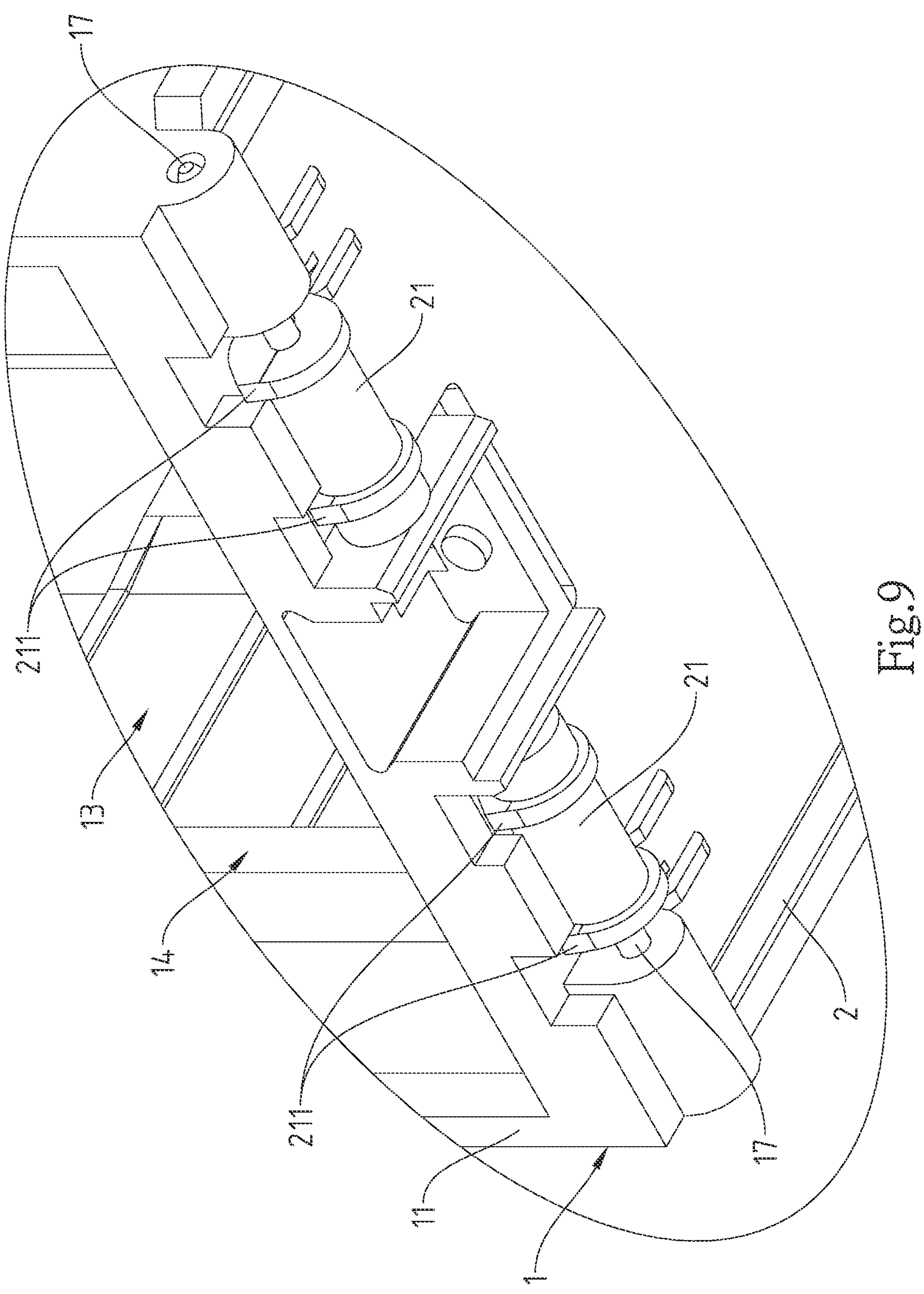
FIG. 9 is an enlarged view of a portion of the box body and a front end of a bottom cover of the bill receiving box according to the present invention.
Figure 10:
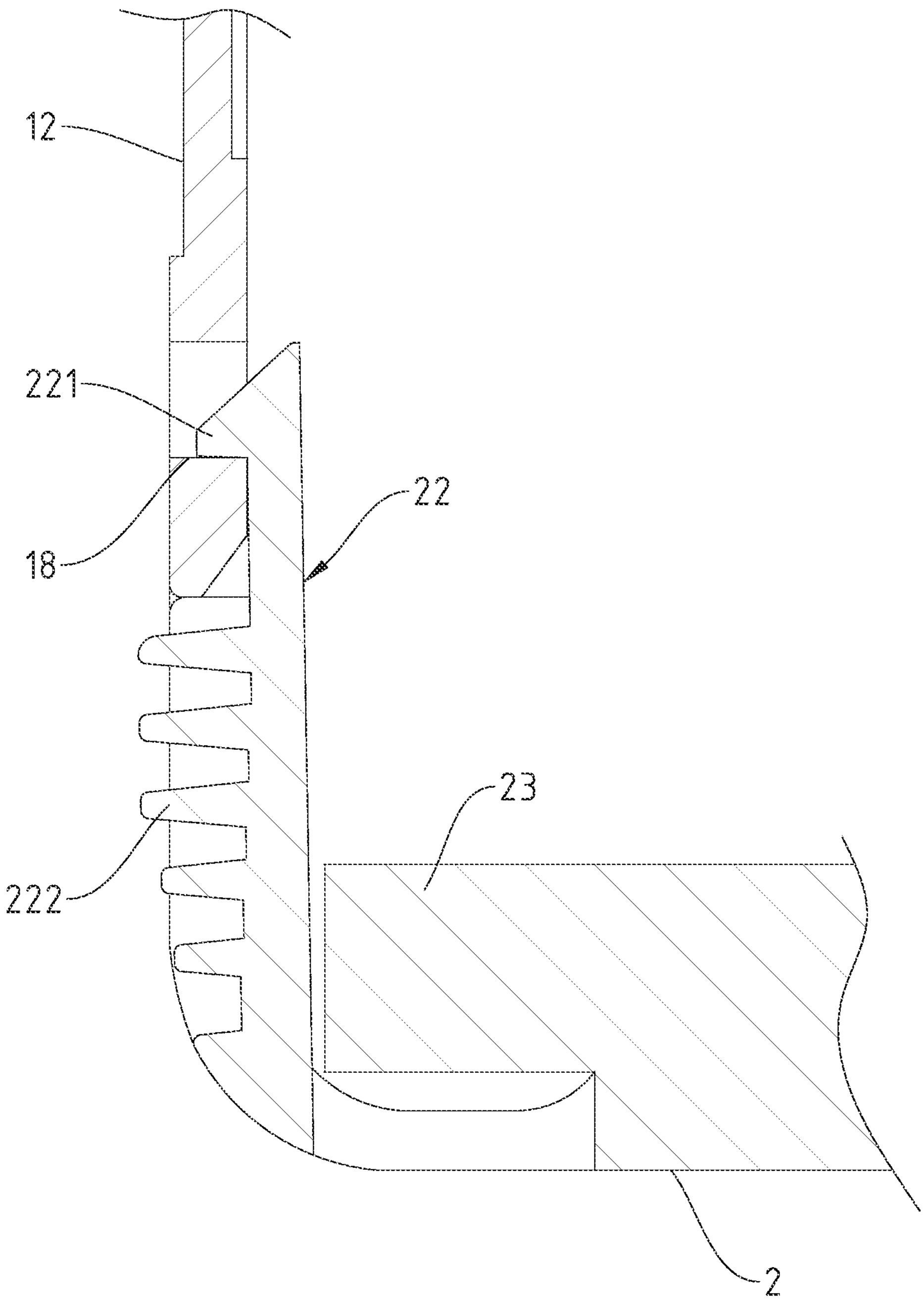
FIG. 10 is an enlarged cross sectional view of a portion of the box body and a rear end of the bottom cover of the bill receiving box according to the present invention.

The front and rear springs 5 and 6 are disposed in the receiving space 13 of the box body 1 and spaced from each other in the front-rear direction. As shown in FIGS. 4, 7, and 8, the front spring 5 includes two ends respectively abutting against the hooked portions 32 on the rear side of the front pressing board 3 and the rear pressing board 4, and the rear spring 6 includes two ends respectively abutting against the hooked portions 42 on the rear side of the rear pressing board 4 and the hooked portions 122 on the rear end of the box body 1.

In use, the bill receiving box 10 is disposed behind the bill receiving device 7. As shown in FIGS. 1-3 and 14, the bill pressing opening 14 of the box body 1 and the front pressing board 3 of the bill receiving box 10 face the bill pushing mechanism 74 and the bill pushing board 75. The rear spring 6 biases the rear pressing board 4 and the front spring 5 forward. The front spring 5 biases the front pressing board 3 forward to abut against a rear side of the bill pressing opening 14.

When a bill 8 enters via the bill inlet 72 of the bill receiving device 7 (see FIG. 14), the bill receiving device 7 delivers the bill 8 rearward, and the bill detection mechanism 73 detects whether the bill 8 is genuine. When it is determined that the bill 8 is genuine, the bill pushing mechanism 74 pushes the bill pushing board 75 rearward, which, in turn, pushes the bill 8 and the front pressing board 3 into the receiving space 13 of the box body 1 (see FIG. 15).

Figure 16:
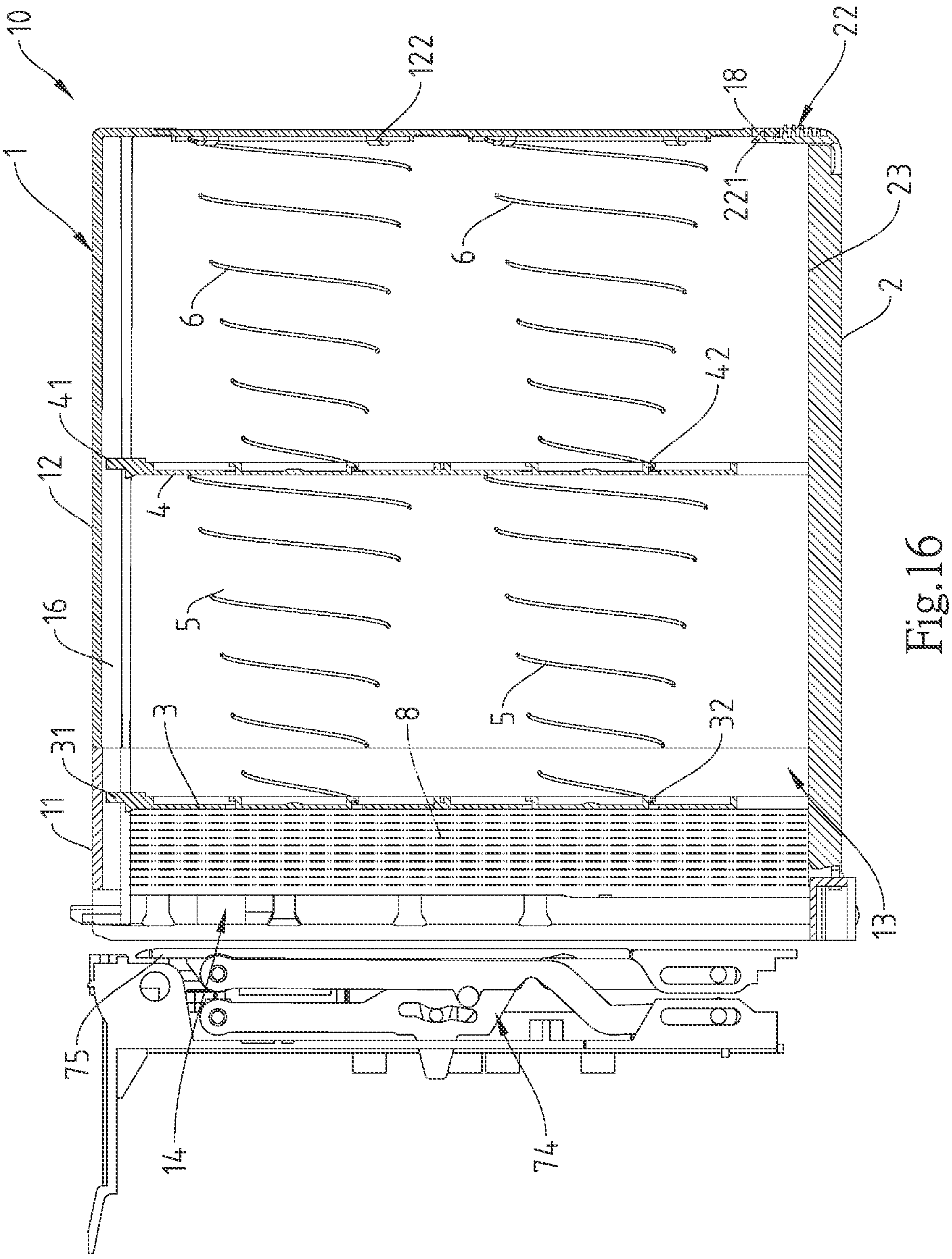
FIG. 16 is a schematic cross sectional view illustrating bill pressing operation of the bill receiving box according to the present invention.
Figure 17:
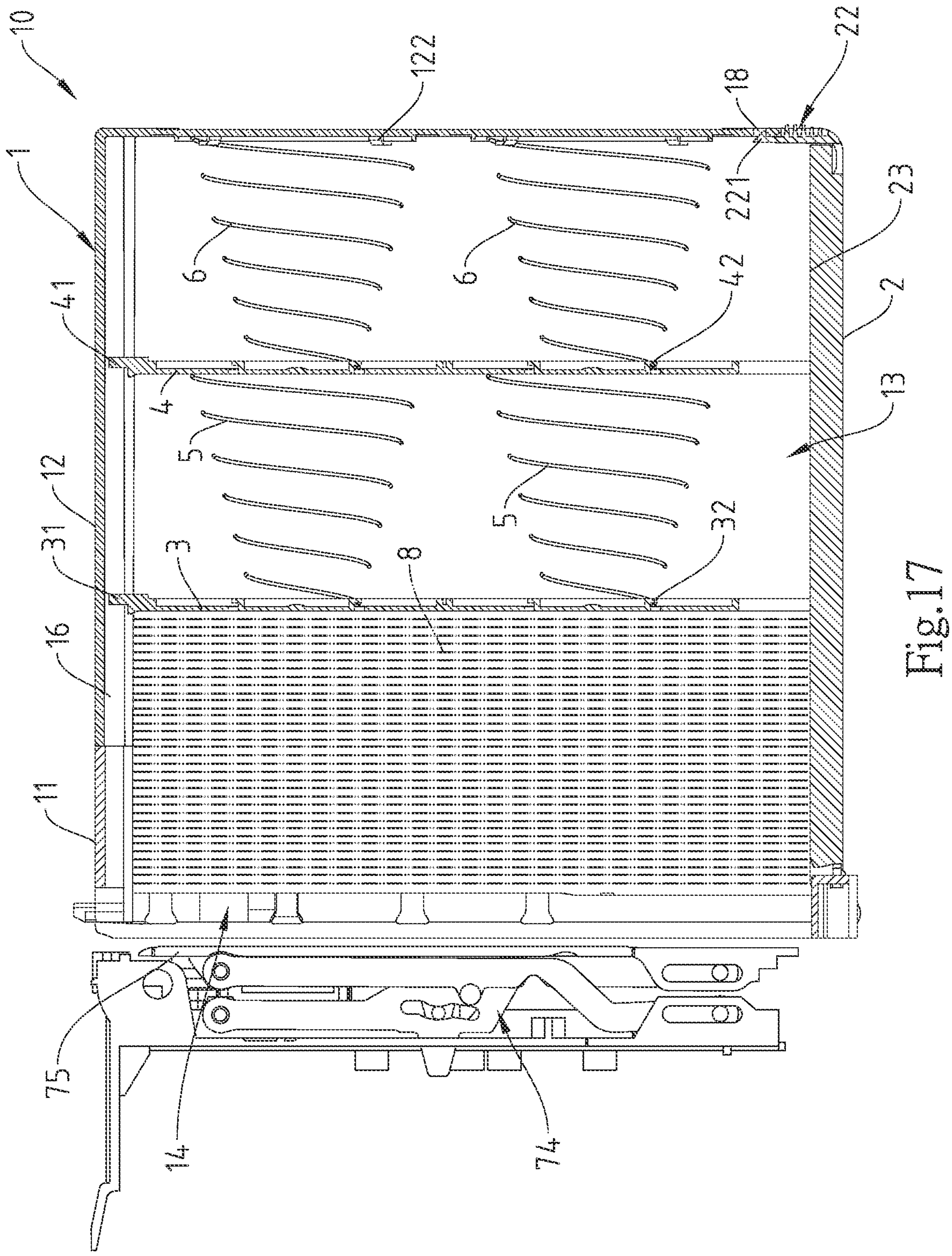
FIG. 17 is a schematic cross sectional view illustrating reception of more bills by the bill receiving box according to the present invention.

Then, the returning force of the rear spring 6 moves the rear pressing board 4 and the front spring 5 forward, whereas the returning force of the front spring 5 pushes the front pressing board 3 forward, such that the front pressing board 3 presses the bill 8 forward to abut against the rear side of the bill pressing opening 14 (see FIG. 16). Therefore, bills 8 can be stably received and pressed one by one. Furthermore, the receiving space 13 can receive at least 700 sheets or even more than 1,000 sheets of stacked bills 8 (see FIG. 17). Thus, the frequency and time required by the worker to retrieve the bill receiving box 10 can be reduced.

Figure 11:
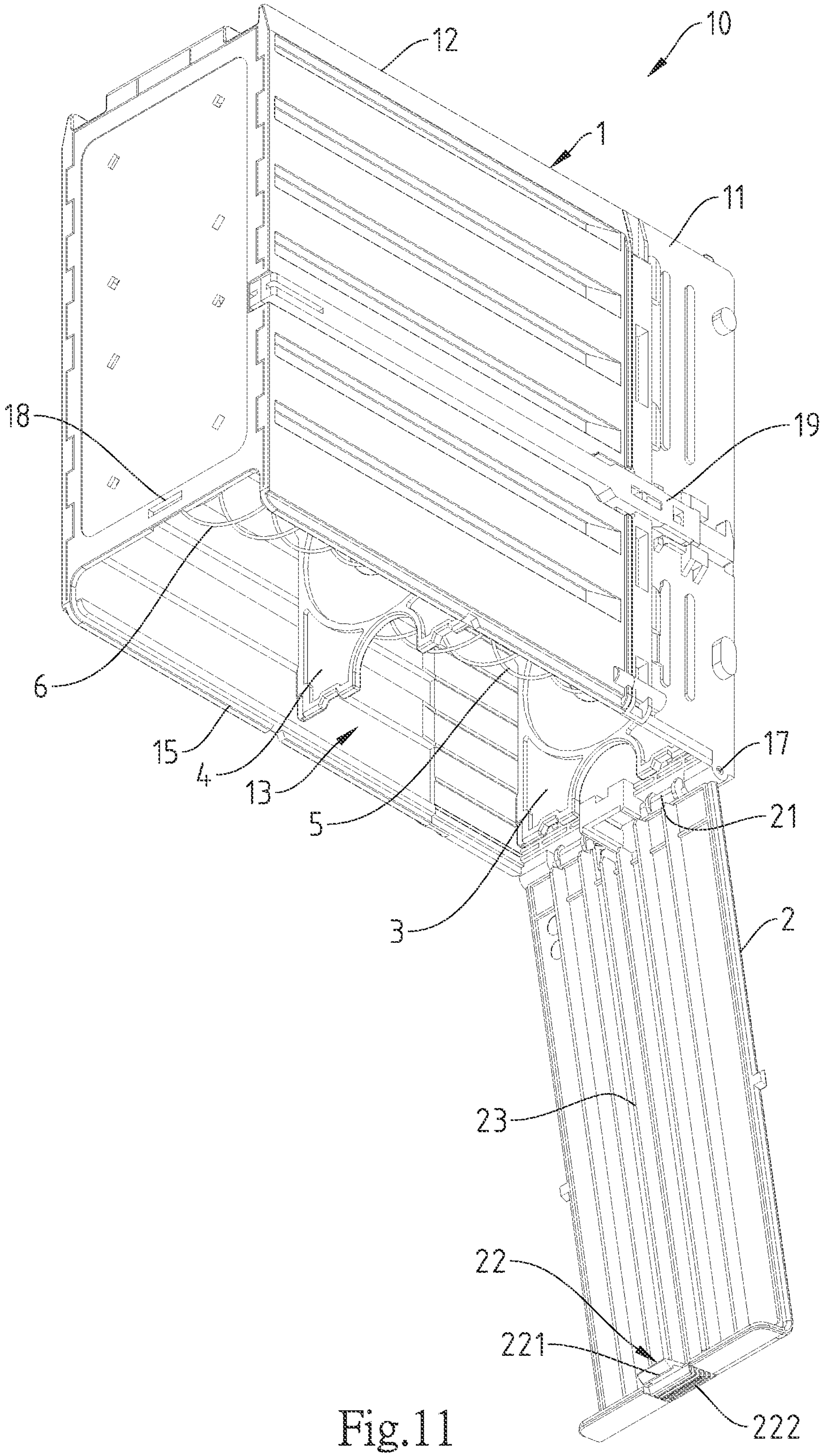
FIG. 11 is a perspective view of the bill receiving box according to the present invention with the bottom cover opened.
Figure 12:
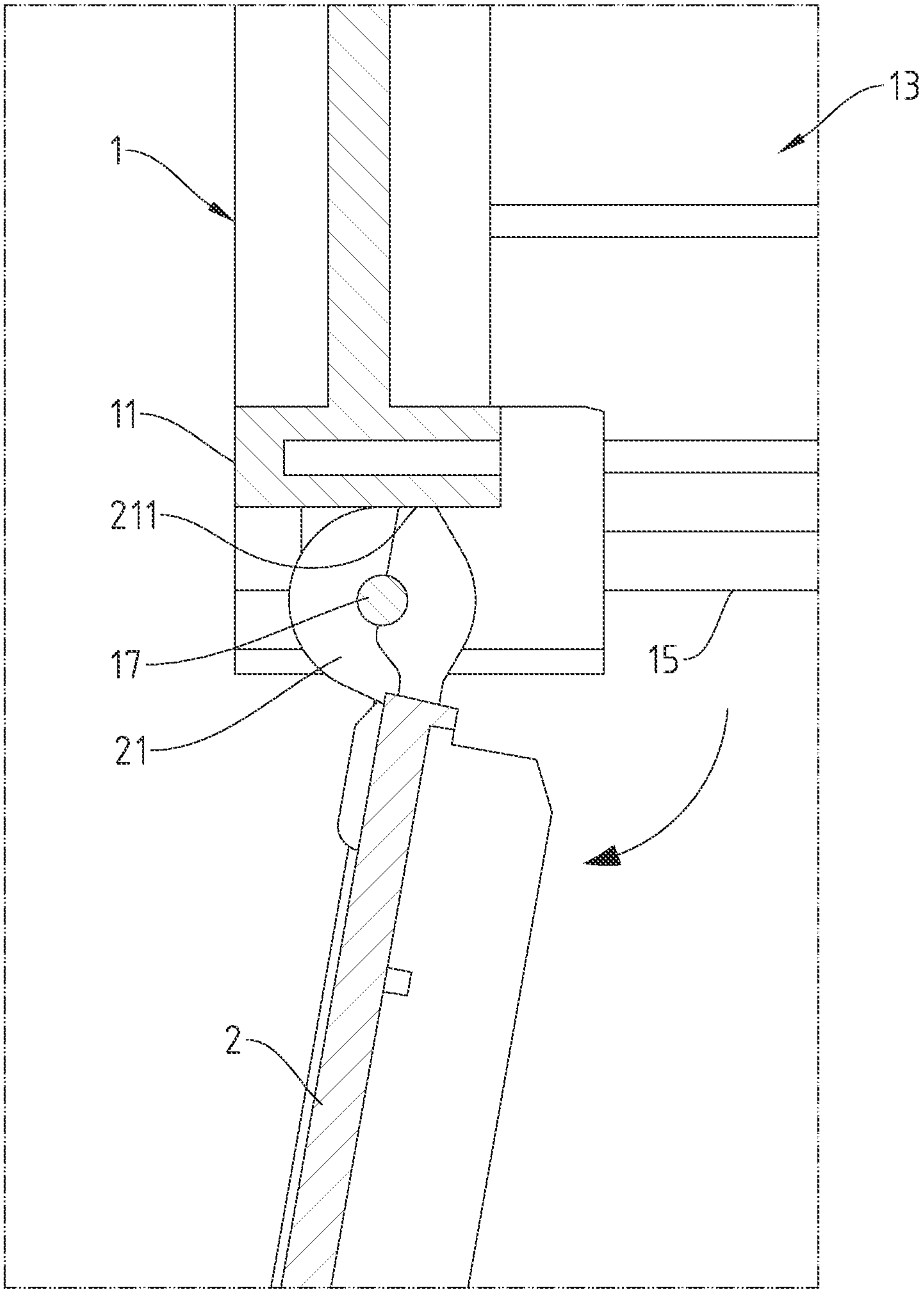
FIG. 12 is an enlarged cross-sectional view of a portion of the bill receiving box according to the present invention with the bottom cover opened and positioned.
Figure 13:
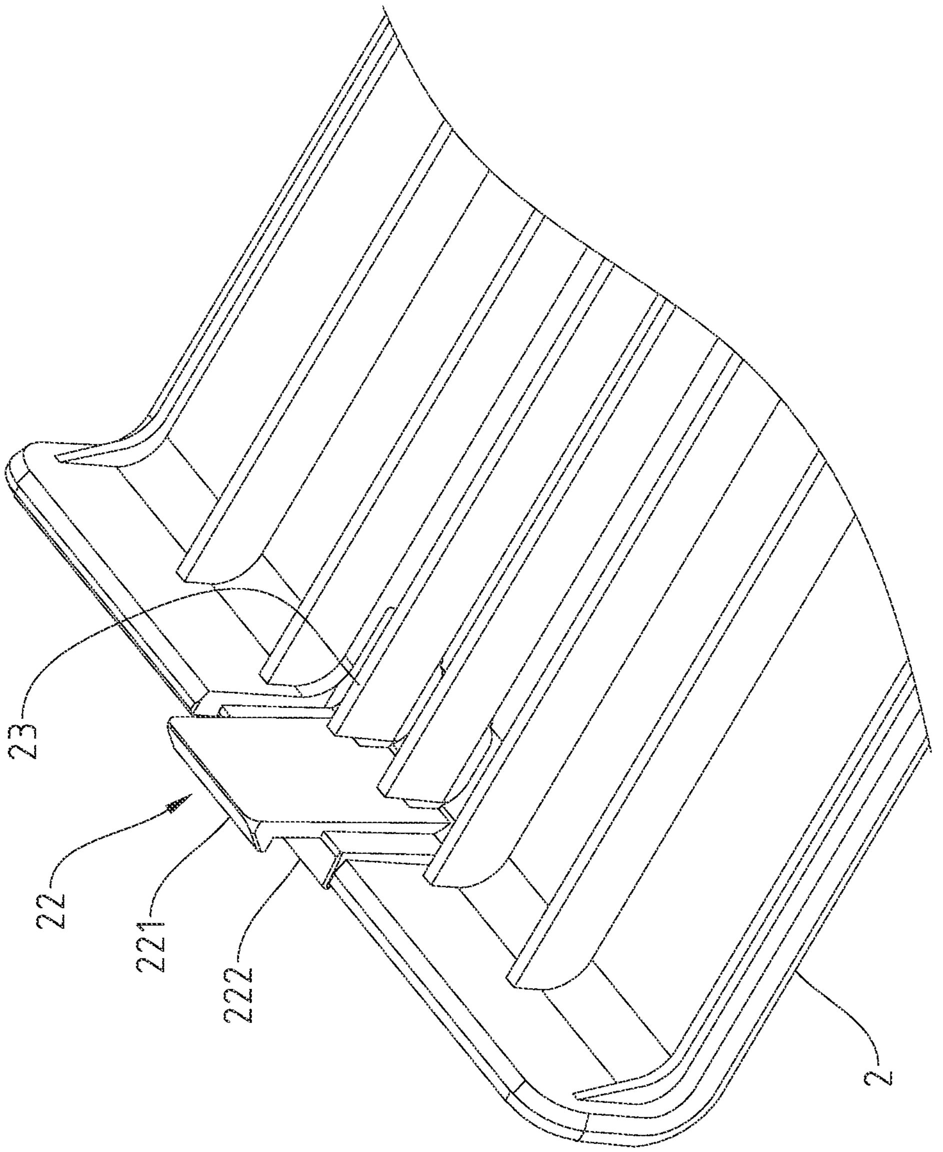
FIG. 13 is a partial, perspective view illustrating the bottom cover and a coupling arm of the bill receiving box according to the present invention.
Figure 14:
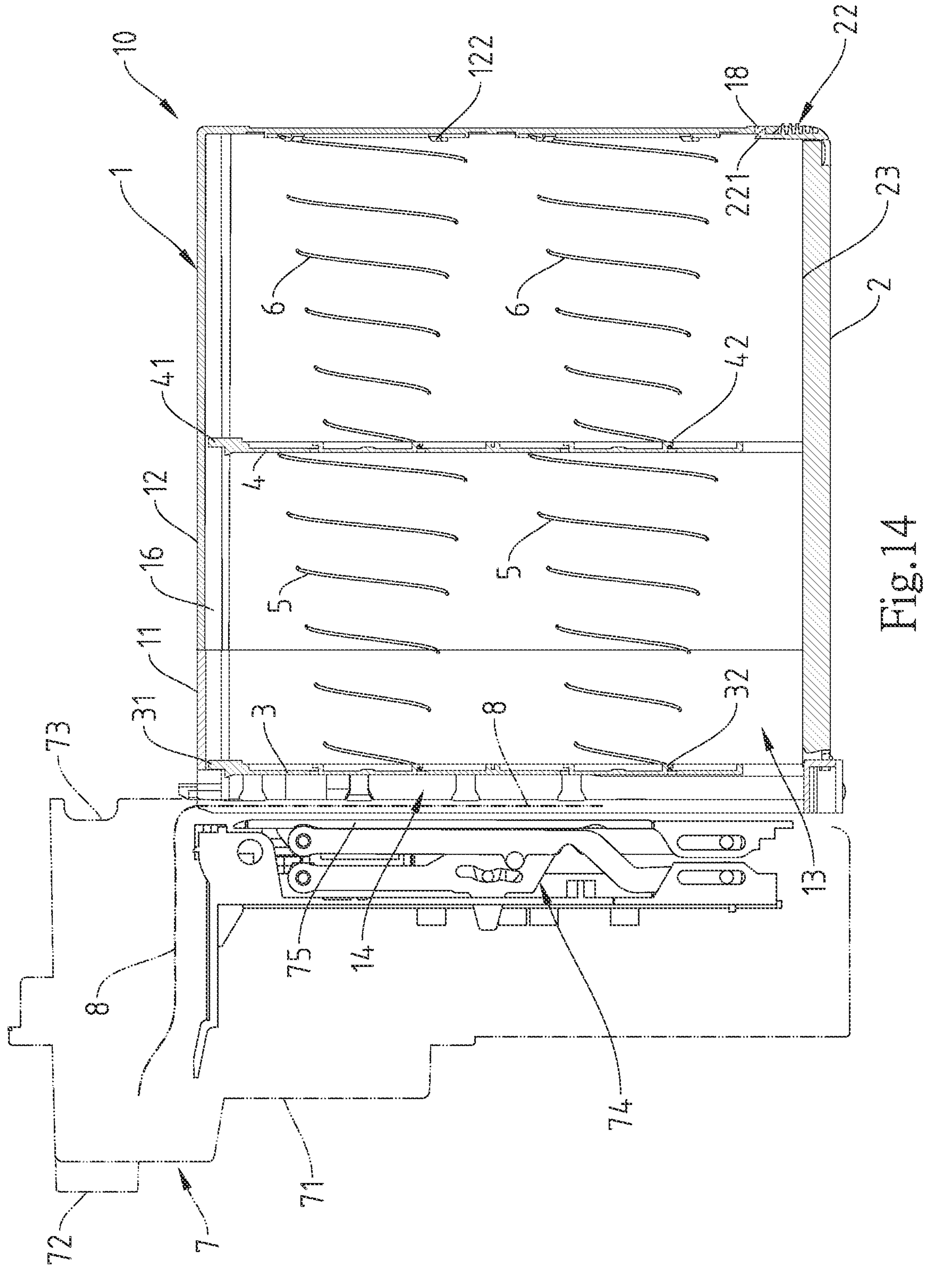
FIG. 14 is a schematic cross sectional view illustrating use of the bill receiving box according to the present invention coupled with the bill receiving device.

Referring to FIG. 17 again, the bill receiving device 7 and the bill receiving box 10 continues the bill receiving and pressing procedures. When the bills 8 received in the bill receiving box 10 is nearly full, the worker can retrieve the bills 8 in the bill receiving box 10. The worker firstly press the coupling arm 22 of the bottom cover 2 to move the coupling portion 221 forward to thereby disengage from the coupling hole 18 (see FIGS. 11 and 12). The limiting member 23 limits the forward pressing travel of the coupling arm 22 to avoid breakage and damage resulting from excessive pressing of the coupling arm 22. Then, the bottom cover 2 pivots downward about the pivotal axle 17 through 90 degrees to an open position, and the abutting portion 211 pivots upward to a location positioned by the front end of the bottom portion of the box body 1. This can prevent accidental closure of the bottom cover 2 and permit the worker to easily remove the bills 8 via the bill retrieving opening 15 of the box body 1. Next, the bottom cover 2 is moved back to close the bill retrieving opening 15.

The above embodiments are merely for easy explanation of the present invention, rather than restricting the invention. Numerous modifications and variations made by persons skilled in the art without departing from the spirit of the invention should still fall within the scope of the accompanying claims.

The invention claimed is:

1. A bill receiving box for receiving a plurality of bills pushed thereinto by a bill receiving device, with the bill receiving box comprising:

a box body including a receiving space configured for receiving the plurality of bills stacked in a front-rear direction, wherein the box body includes a front end having a bill pressing opening intercommunicating with the receiving space, and wherein the box body includes a bottom portion having a bill retrieving opening intercommunicating with the receiving space;

a bottom cover pivotably connected to the bottom portion of the box body and configured for controlling opening and closing of the bill retrieving opening;

a front pressing board and a rear pressing board which are disposed upright in the receiving space in a vertical direction perpendicular to the front-rear direction and which are slidable in the front-rear direction, wherein the front pressing board faces the bill pressing opening, and wherein the rear pressing board is disposed behind and spaced from the front pressing board;

a front spring disposed in the receiving space of the box body, wherein the front spring includes two ends respectively abutting against the front pressing board and the rear pressing board; and a rear spring disposed in the receiving space of the box body and spaced from the front spring in the front-rear direction, wherein the rear spring includes two ends respectively abutting against the rear pressing board and a rear end of the box body, wherein the rear spring biases the rear pressing board and the front spring forward, wherein the front spring biases the front pressing board forward, such that the front pressing board presses the plurality of bills forward to abut against a rear side of the bill pressing opening, and wherein the receiving space is configured to receive at least 700 sheets of stacked bills, wherein the box body includes a pivotal axle disposed on the front end of the bottom portion of the box body, wherein the bottom cover includes a front end having a pivotal portion in pivotal connection with the pivotal axle, wherein the pivotal portion includes an abutting portion protruding outward from an outer periphery of the pivotal portion, wherein when the bottom cover pivots downward about the pivotal axle through at least 90 degrees to an open position, the abutting portion pivots upward to a location positioned by the front end of the bottom portion of the box body.

2. The bill receiving box as claimed in claim 1, wherein the receiving space of the box body is configured to receive at least 1,000 sheets of stacked bills.

3. The bill receiving box as claimed in claim 2, wherein the box body includes a length in the front-rear direction greater than a height of the box body in the vertical direction.

4. The bill receiving box as claimed in claim 1, wherein the bottom portion of the box body includes the rear end having a coupling hole intercommunicating with the receiving space, wherein the bottom cover includes a rear end having a coupling arm capable of moving into and out of the receiving space, wherein the coupling arm includes a distal end having a coupling portion configured to be inserted rearward to couple with the coupling hole, wherein the coupling arm includes a pressing portion which is pressable to move the coupling portion forward to thereby disengage from the coupling hole, and wherein the bottom cover includes a limiting member adjacent to the pressing portion for limiting forward pressing travel of the coupling arm.

* * * * *